United States Patent [19]
Kugo et al.

[11] Patent Number: 4,673,252
[45] Date of Patent: Jun. 16, 1987

[54] LIQUID CRYSTAL COLOR DISPLAY APPARATUS HAVING FIXED AND VARIABLE COLOR REGIONS

[75] Inventors: Masaru Kugo, Ibaraki; Osamu Igarashi, Katsuta; Kozo Katogi, Katsuta; Hiroshi Ito, Katsuta; Mamoru Nakamura, Katsuta, all of Japan

[73] Assignees: Hitachi, Ltd.; Hitachi Automotive Engineering Co., Ltd., both of Japan

[21] Appl. No.: 850,684

[22] Filed: Apr. 11, 1986

[30] Foreign Application Priority Data

Apr. 17, 1985 [JP] Japan .................. 60-76470
Apr. 17, 1985 [JP] Japan .................. 60-80206

[51] Int. Cl.⁴ .............................................. G02F 1/13
[52] U.S. Cl. .............................. 350 Y/339 F; 350/336
[58] Field of Search ............................ 350/336, 339 F

[56] References Cited

U.S. PATENT DOCUMENTS 4,294,524 10/1981 Stolov ................... 350/339 F X
4,410,887 10/1983 Stolov et al. ........... 350/339 F X
4,579,424 4/1986 Matsukawa ............. 350/339 F X

FOREIGN PATENT DOCUMENTS 5910988 7/1982 Japan .
59-90818 5/1984 Japan .

*Primary Examiner*—John K. Corbin
*Assistant Examiner*—Richard F. Gallivan
*Attorney, Agent, or Firm*—Antonelli, Terry & Wands

[57] ABSTRACT

A liquid crystal color display apparatus includes a liquid crystal display panel having a section with transparent electrodes provided with color filters in striped formation and another section with transparent electrodes provided with no color filters, and separate electrode drive circuits for applying a voltage to the electrodes of the former section and another voltage to the electrodes of the latter section, with the intention of achieving little difference of brightness between both sections. The color filters in striped formation are provided in the entire area including display pattern segments having the arrangment of the transparent electrodes and a background area without transparent electrodes, with the intention of equalizing the visibility of unlighted segments and the background.

10 Claims, 12 Drawing Figures

LIQUID CRYSTAL COLOR DISPLAY APPARATUS HAVING FIXED AND VARIABLE COLOR REGIONS

BACKGROUND OF THE INVENTION

This invention relates to a liquid crystal display apparatus and, particularly, to a liquid crystal color display apparatus suitable for use as a pilot's or driver's instrument panel installed on the aircraft, automobile, or the like for displaying vehicle operational data in variable color.

Figure 3:
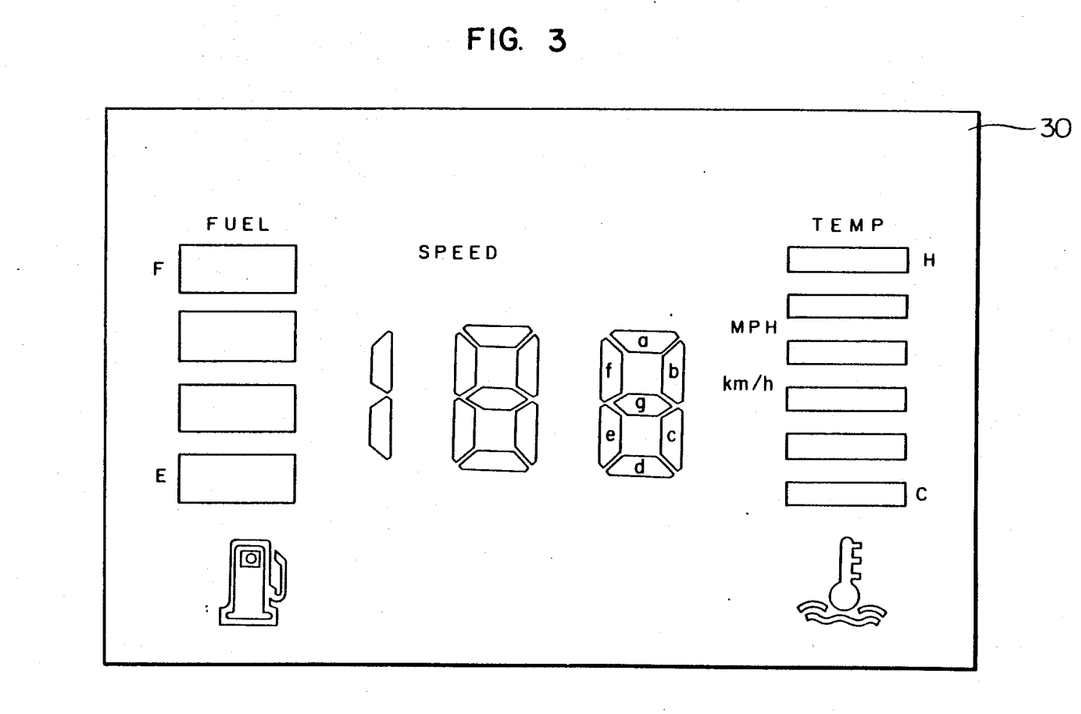
FIG. 3 is an illustration showing an example of a liquid crystal panel applied to the automobile instrument panel.
Figure 4:
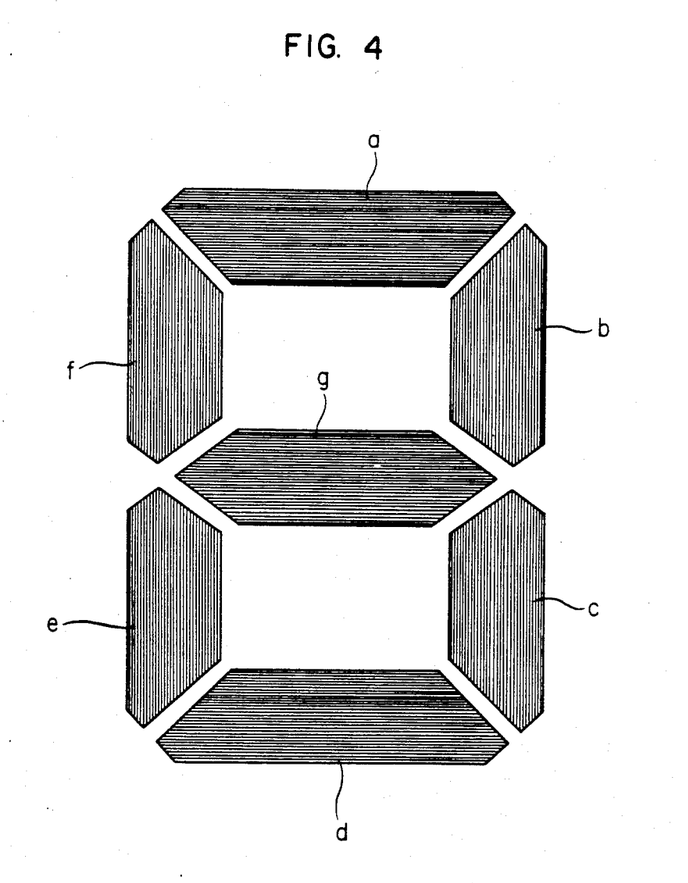
FIG. 4 is a diagram showing a pattern set of seven segments for the unit digit of the speedmeter section shown in FIG. 3.

There has been known a liquid crystal color display panel having an array of color filters provided on the transparent electrodes in the liquid crystal panel so that variable-color display is achieved by selective combinations of active electrodes, as disclosed in Japanese Patent Unexamined Publication No. 59-90818. In the arrangement of such a liquid crystal display panel made up of display pattern segments each having transparent electrodes covered by color filters and those without filters, different brightness is created among portions with and without color filters, and impaired legibility and appearance of display resulting from this structure has been a major problem of the liquid crystal color display panel. FIGS. 3 and 4 show the conventional liquid crystal color display panel applied to the automobile instrument panel 30, which includes a speedmeter section operative in variable color in the center and a fuel gauge section and thermometer section operative in fixed color on the left and right. The transparent electrodes in the variable-color display section are overlaid with color filters, and a different brightness is created in this section from that of the fixed color display sections due to a voltage drop across the filter film.

Another drawback of the conventional liquid crystal color display panel, in which color filters are provided only over transparent electrodes of each display pattern segment, is that the color filters are visible unseemly on the background even if the segment is not activated, and this also impairs the legibility and appearance of display. For example, the speedmeter section of FIG. 3 includes the unit digit made up of seven segments a, b, c, d, e, f and g, and when a character "7" is displayed, only segments a, b and c are activated. In this case, the inactive segments d, e, f and g are desirably invisible completely, but actually the presence of color filters makes these unlighted segments visible improrperly on the background.

There has been known a liquid crystal color display panel in a dot-matrix structure, as disclosed in Japanese Patent Unexamined Publication No. 59-10988. This apparatus includes thin film driving transistors formed on a liquid crystal substrate with color filters of red, green and blue formed over the entire panel surface. However, this type of liquid crystal color display panel is complex in its fabricating process, needs a sophisticated manufacturing facility comparable with that for semiconductor devices, and therefore is expensive in cost.

SUMMARY OF THE INVENTION

An object of this invention is to provide a liquid crystal color display panel including transparent electrodes provided thereon with color filters and those without color filters intermixed on a single display panel, with the intention of improving the legibility and appearance of display.

The above object is achieved by minimizing the difference of brightness among portions with and without color filters through the provision of separate liquid crystal drive circuits for the panel sections depending on the presence or absence of color filters.

The above object is also achieved by making inactive display pattern segments visually indistinguishable from the background through the striped arrangement of color filters not only over display pattern segments, but also over the entire panel area.

DESCRIPTION OF THE PREFERRED EMBODIMENTS

An embodiment of this invention will now be described with reference to the drawings. Initially, an example of layout of the liquid crystal display panel will be explained in connection with FIG. 3. The display panel includes in the center a speedmeter section seen as patterns "1", "8" and "8" in the diagram for displaying the vehicle speed in a 3-digit number (km/h or MPH, selectively), and the pattern "8" consists of seven segments a, b, c, d, e, f and g. Arranged on the left of the speedmeter section is a fuel gauge section for displaying the quantity of remaining fuel in a bar graph fashion, and the similar arrangement on the right of the speedmeter section is a thermometer section for displaying the engine coolant temperature in a bar graph fashion. Among the display sections the speedmeter is displayed in variable color depending on the vehicle speed measured, e.g., a vehicle speed in the range 0-60 km/h is displayed in green, a speed in the range 61-99 km/h is displayed in yellow, and a speed in the range 100–180 km/h is displayed in red with the intention of prompting the driver to be careful with the situation. On the other hand, the fuel gauge section and thermometer section are displayed in a fixed color, e.g., green, orange or the like.

Figure 5:
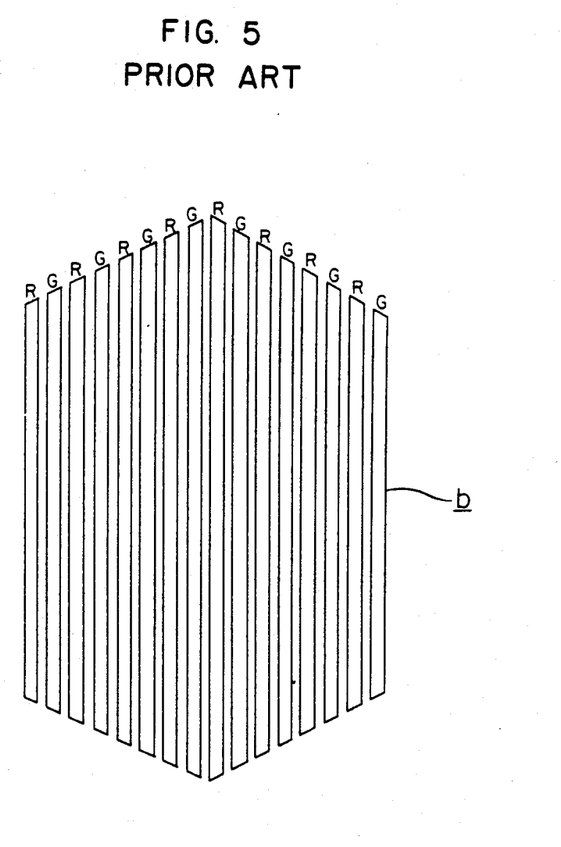
FIG. 5 is a diagram showing one of seven segments shown in FIG. 4 with the conventional arrangement of color filters provided on it.

Next, the method of varying the color for the speedmeter section will be described. FIG. 4 shows a character pattern "8" made up of seven segments a, b, c, d, e, f and g. Each segment consists of a striped formation of transparent electrodes each overlaid with a stripe of color filter. FIG. 5 shows in more detail a part of the segment b, as an example, which is an array of thin transparent electrodes overlaid with an alternate arrangement of red and green color filters as shown by R and G, respectively. Although the arrangement includes filters of only two colors, red and green, for producing colors of red, yellow and green, blue filters may be added when more virieties of color are required.

Figure 8:
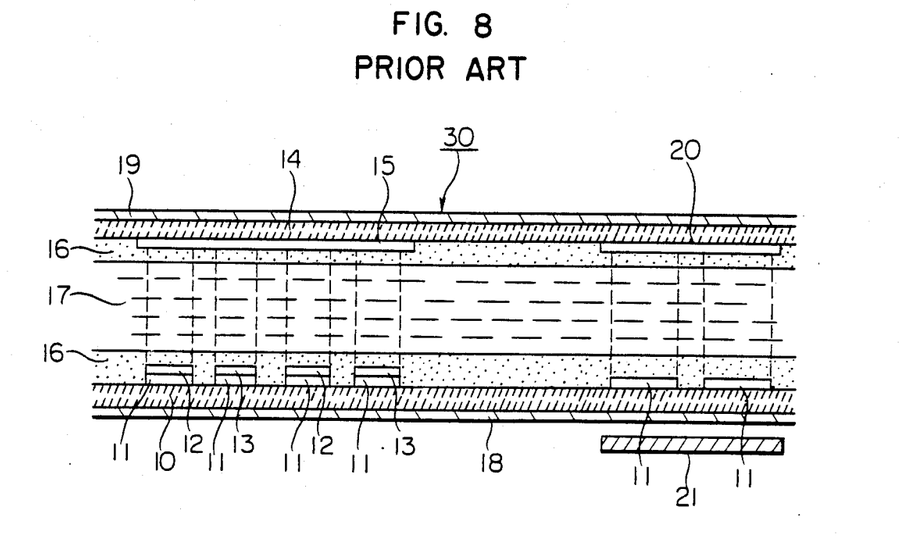
FIG. 8 is a cross-sectional view of the conventional liquid crystal display panel.
Figure 9:
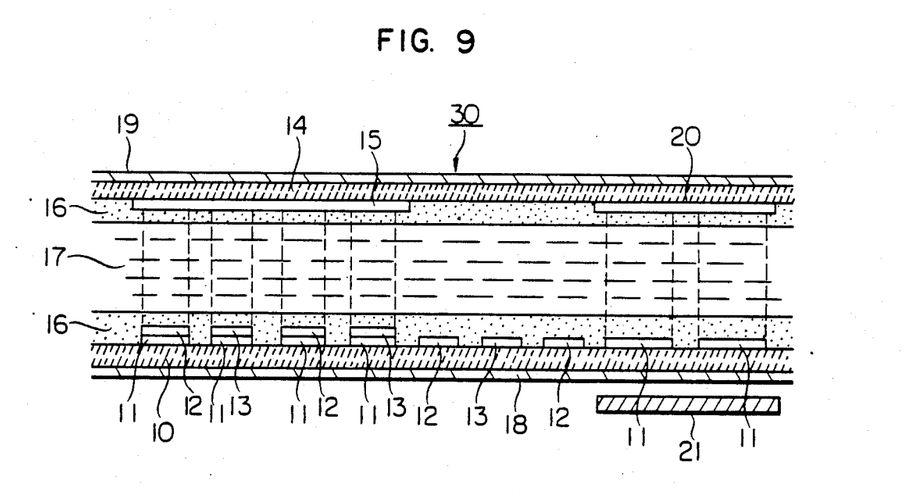
FIG. 9 is a cross-sectional view of the liquid crystal display panel according to the present invention.

FIG. 8 shows the sectional structure of the conventional liquid crystal variable-color display panel, and FIG. 9 shows the counterpart of the present invention in which color filters are provided also in the background area. Both structures have a bottom glass plate 10, which is overlaid with a striped formation of segment transparent electrodes 11 so as to form a display pattern, each of which is overlaid with a red filter 12 or green filter 13. The color filters are made of material, e.g., gelaltin, having properties of easy coloring process in fine patterns and stable color regeneration, and formed in a thickness of 1.0–2.0 μm. Opposing the bottom glass plate 10 is an top glass plate 14, on which a common transparent electrode 15 is formed. The reason for the disposition of the color filters on the side of the segment transparent electrodes 11 is based on the consideration of displacement between both members during the fabricating process, although it is also possible to place the color filters on the common transparent electrode 15 as opposed to these cases shown.

Over the upper and lower transparent electrodes inside the panel, orientation films 16 for polarizing liquid crystal molecules to a certain direction are provided, and liquid crystal material 17 is filled in the space between the films. The bottom glass plate 10 and top glass plate 14 are coated on their external sides with a lower polarizing plate 18 and upper polarizing plate 19, respectively.

Figure 2:
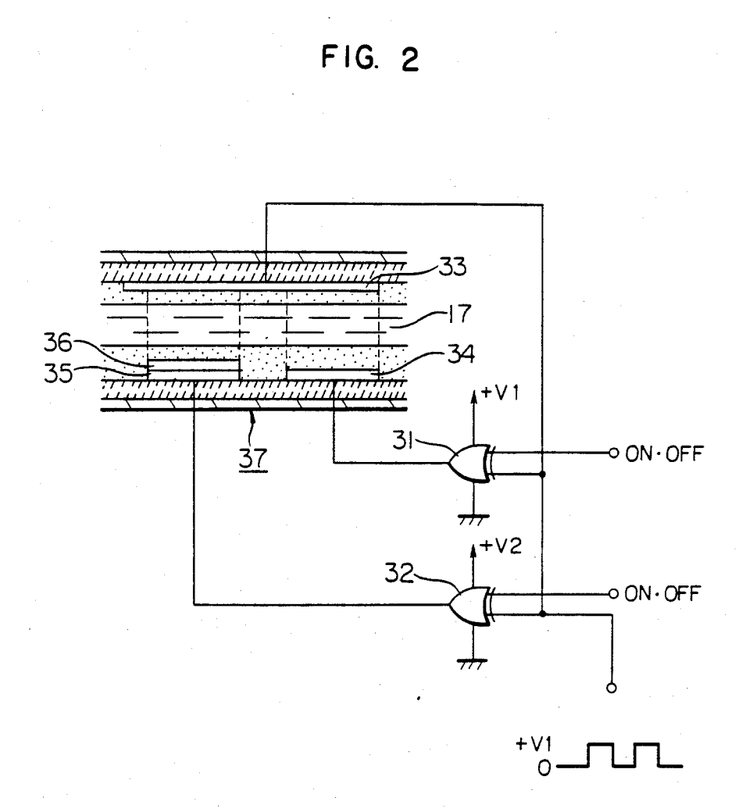
FIG. 2 is an illustration showing part of the liquid crystal display panel and associated liquid crystal drive circuit.

FIGS. 8 and 9 also show on the right-hand section the panel structure used for fixed color display. Different from the variable-color display section, the color filters 12 and 13 are not provided on the transparent electrodes 11, and another common transparent electrode 20 is provided separately from that 15 for the variable-color display section for the purpose of independent voltage control, although they may be formed as a unitary common electrode as shown in FIG. 2.

The color of the fixed-color display section is determined by a color filter plate 21 placed outside the lower polarizing plate 18, and the array of transparent electrodes 11 appears in that color.

Figure 10:
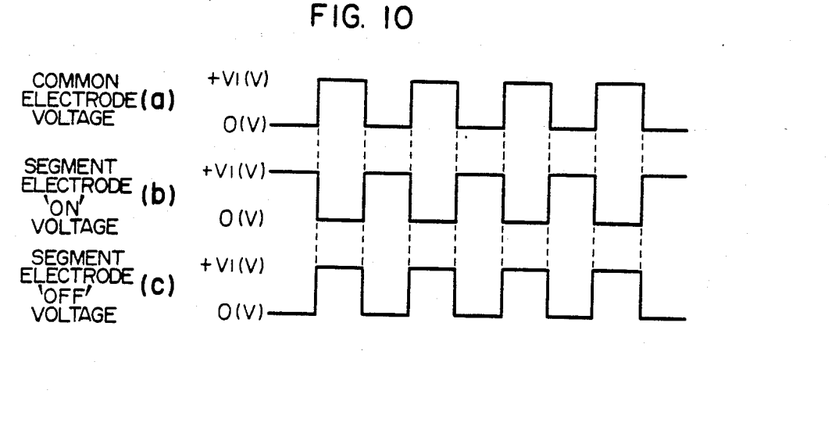
FIG. 10 is a waveform diagram showing the liquid crystal drive voltages.

Next, the commonly employed static drive system for the liquid crystal display panel will be described with reference to FIG. 10. Voltage pulses shown in FIG. 10 (a)–(c) are applied to the segment electrodes 11 and common electrode 20 shown in FIG. 9. When the voltage pulses on the segment electrodes are out of phase by $\pi$ with those on the common electrode, as shown by FIG. 10 (a) and (b), the liquid crystal is polarized (on-state), and when the voltage pulses on both electrodes are in phase with each other, as shown by FIG. 10 (a) and (c), the liquid crystal stays inert (off-state).

Figure 11:
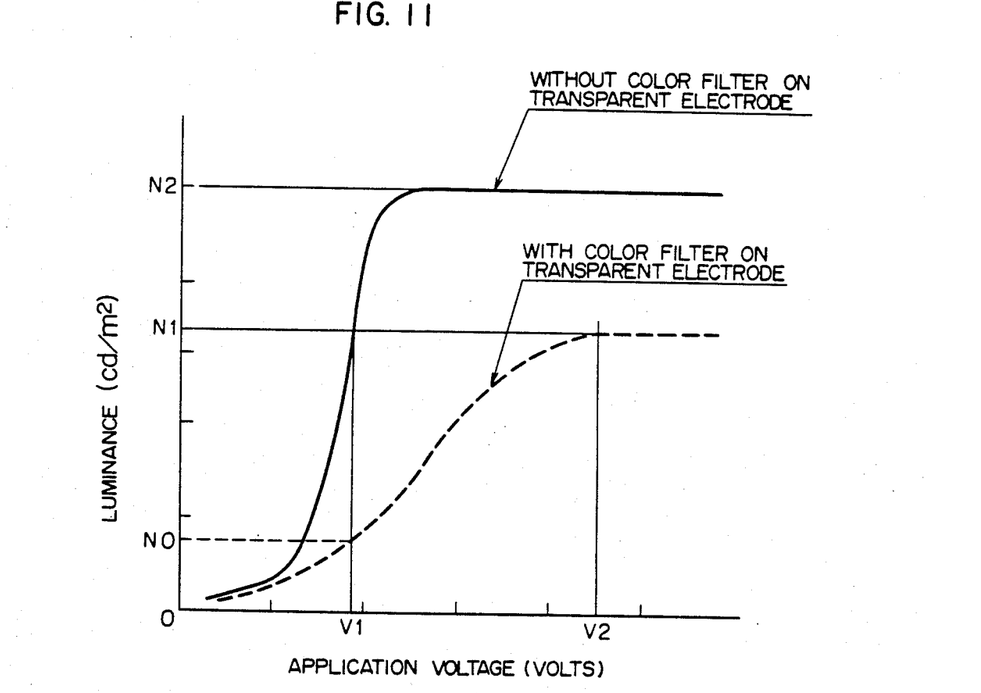
FIG. 11 is a graph showing the optical characteristics of the fixed-color section and variable-color section of the liquid crystal display panel according to the present invention.

FIG. 11 is a graphical representation showing the application voltage vs. luminance characteristics for the variable-color display section with color filters provided on the transparent electrodes and for the fixed-color display section without color filters. It is obvious from the graph that application of the same voltage to the variable-color display section with filters and to the fixed-color display section without filters causes a different luminance on the display panel, which results in a impaired legibility and appearance. Namely, application of voltage V1 provides a luminance of N1 $Cd/m^2$ in the fixed-color display section, while the same voltage provides a luminance of N0 in the variable-color display section. The major causes of the lower luminance in the variable-color display section are the presence of the color filters on the transparent electrodes, which lower the crystal application voltage due to a voltage drop across the filter film, and the striped formation of each segment, which reduces the vignetting factor of the optical structure, as will be appreciated from the cross-sectional view of FIG. 9.

The inventors of the present invention have recognized the need of selecting optimal application voltages for the variable-color display section and fixed-color display section separately in order to achieve a uniform visibility over the entire liquid crystal display panel. The present invention is based on this recognition, and it is intended to control the liquid crystal drive voltages for the variable-color display section and fixed-color display section individually so that active pattern segments in both sections constructed in the same liquid crystal panel are visible in virtually the same brightness.

Figure 1:
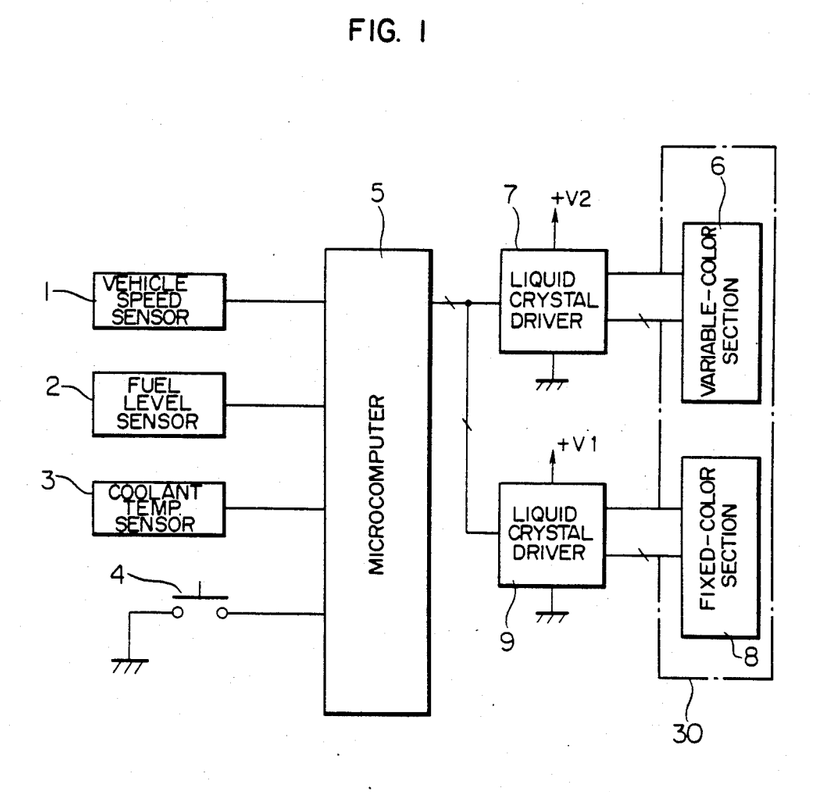
FIG. 1 is a block diagram showing the display control circuit according to this invention.

The inventive liquid crystal display apparatus will be described with reference to FIGS. 1 and 2. In FIG. 1 showing in block diagram the control circuit in the liquid crystal display apparatus, reference number 1 denotes a speed sensor for measuring the vehicle speed, and it supplies a speed signal after waveform shaping to a microcomputer 5. 2 is a fuel sensor for measuring the quantity of remaining fuel in the vehicle fuel tank, and 3 is a thermal sensor for measuring the engine coolant temperature, both analog signals being converted into digital data in the microcomputer 5. 4 is a switch for selecting km/h or MPH as unit of the vehicle speed displayed. The microcomputer 5 processes the input signals and produces display signals to be supplied to the liquid crystal display panel 30. The display panel 30 includes a variable-color display section 6 used to display the vehicle speed, and it is driven by a liquid crystal drive circuit 7 with application voltage V2. The display panel 30 also includes a fixed-color display section 8 used to display the fuel quantity and engine coolant temperature in bar graph, and it is driven by another liquid crystal drive circuit 9 with application voltage V1. The liquid crystal drive circuits 7 and 9 operates in response to the display signals provided by the microcomputer 5.

The application voltages V1 and V2 are set so that the equal luminance N1 ($Cd/m^2$) is obtained in both the variable-color display section 6 and fixed-color display section 8, as shown in FIG. 11. As mentioned previously, the present invention is intended to equalize the visibility of two types of display sections by application of separate drive voltages.

Although the embodiment of FIG. 1 has the common transparent electrodes provided separately for the variable-color display section 6 and fixed-color display section 8, both sections can share a unitary common transparent electrode to achieve the same control, provided that separate drive voltage pulses are applied to the individual electrodes of these sections.

Figure 12:
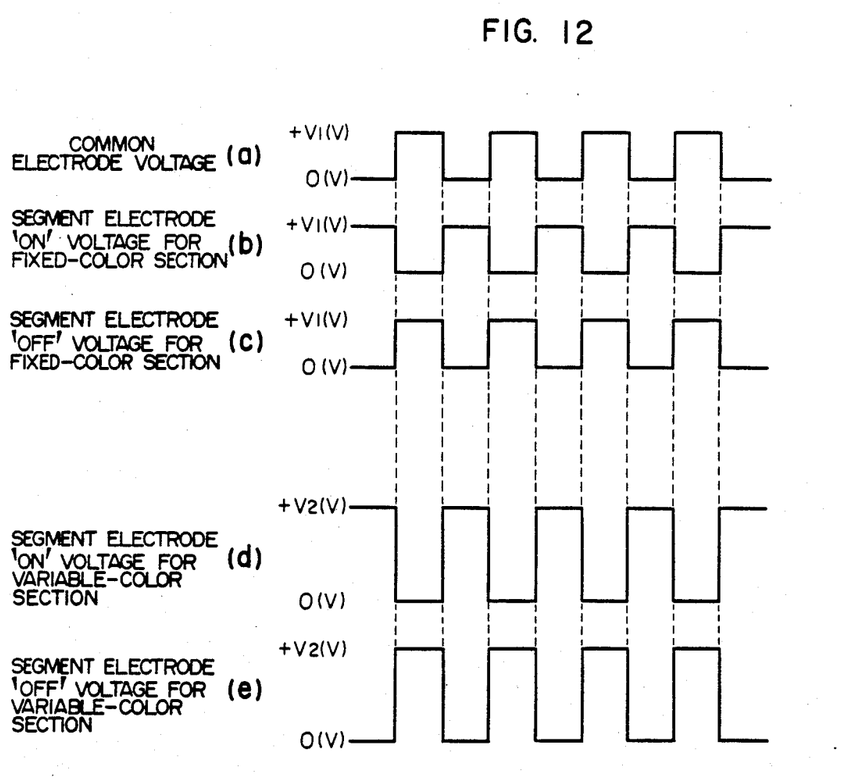
FIG. 12 is a waveform diagram showing the liquid crystal drive voltages produced by the control circuit shown in FIG. 1.

FIG. 12 shows the waveform of voltage pulses applied to the individual electrodes of the variable-color and fixed-color display sections which share a common electrode. As shown in FIG. 11, the variable-color display section needs a higher application voltage than that for the fixed-color display section so as to achieve an equal luminance on both sections. On this account, the rectangular voltage waveform having the same amplitude V1 are used for the common electrode and the segment electrodes of the fixed-color display section, while the rectangular voltage waveform having the amplitude V2 higher than V1 is used for the segment electrodes of the variable-color display section.

FIG. 2 shows another embodiment of the inventive control circuit operative to apply the voltage pulses shown in FIG. 12 to the respective electrodes of the variable-color and fixed-color display sections. The rectangular voltage pulses with 50% duty cycle are applied to a common electrode 33 and, at the same time, received by two exclusive-OR gate circuits 31 and 32 at their one input. The output of the exclusive-OR gate circuit 31 is applied to a segment electrode 34 of the fixed-color display section, while the output of the exclusive-OR gate circuit 32 is applied to a segment electrode 35 of the variable-color display section having a color filter 36 on it. The exclusive-OR gate circuits 31 and 32 provide the output voltages V1 and V2, respectively, which have been set separately. The liquid crystal panel 37 is dimensioned in the sectional structure to have the equal distance between the common electrode 33 and the segment electrode 34 of the fixed-color display section and between the common electrode 33 and the segment electrode 35 of the variable-color display section, with the intention of facilitating the fabricating process. This dimensional scheme is equally applied to the structure of separate common electrodes shown in FIG. 9. The same liquid crystal material 17 is used in the entire panel area. The foregoing structural and circuit arrangements of the liquid crystal display apparatus enables display of patterns at almost indistinguishable visibility among the variable-color and fixed-color display sections.

Next, the arrangement for equalizing the visibility of inactive pattern segments and the background of the liquid crystal display panel will be described. In FIG. 8 showing the sectional structure of the conventional liquid crystal display panel, the left-hand portion is the variable-color display section for displaying 3-digit numbers as shown in FIG. 3, the right-hand portion is the fixed-color display section used for the fuel gauge and thermometer, and the central portion in FIG. 8 is the background in FIG. 3. In FIG. 8, the left-hand section is capable of multiple color display, either monotint or neutral tints, by selective activation of the transparent electrodes 11 formed on the bottom glass plate 10.

The present invention is also intended to equalize the visibility of display pattern segments in the inert state and the background on the liquid crystal multiple-color display panel having red and green filters formed on the transparent electrodes, through the striped arrangement of color filters 12 and 13, as dummy filters, also in area where display pattern segments are absent, as shown in FIG. 9. The dummy filters have not associated transparent electrodes 11, and liquid crystal in this section is inactive invariably. In consequence, some inactive segments among the seven pattern segments a, b, c, d, e, f and g seem in similar tint and tone to those of the background having the dummy color filters, whereby the legibility and appearance of display are enhanced considerably.

Figure 6:
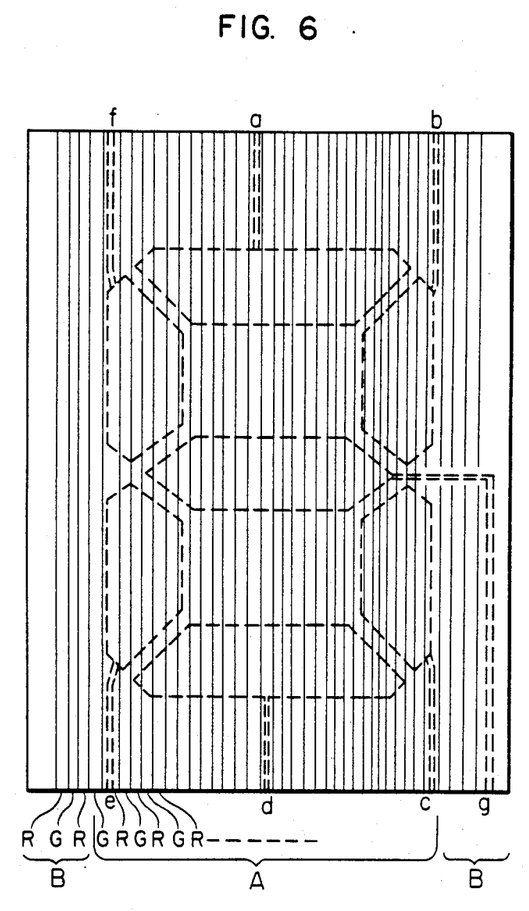
FIG. 6 is a diagram showing the display pattern segments with the striped arrangement of red and green filters provided over the entire panel area.

FIG. 6 shows the striped arrangement of color filters, in which red and green filters shown in FIG. 9 are placed alternately. It should be noted that red, green and blue filters will generally be provided on respective transparent electrodes to constract universal color display panels, and in these cases dummy filters of red, green and blue will be used. In FIG. 6, dummy filters are used for the area indicated by A excluding pattern segments defined by the dashed line and the entire areas indicated by B. Each of the seven segments a, b, c, d, e, f and g defined by the dashed line has its associated segment transparent electrodes connected to the control circuit, and by application of voltage pulses between selected ones of segment transparent electrodes 11 and the common transparent electrode 15 the liquid crystal 17 is activated in these portions, resulting in the transmission of light in red, green, or mixed color depending on the combination of segment transparent electrodes activated. The liquid crystal 17 in portions where the electrodes 11 and 15 do not confront each other stays inert, and the light is not transmitted.

Figure 7:
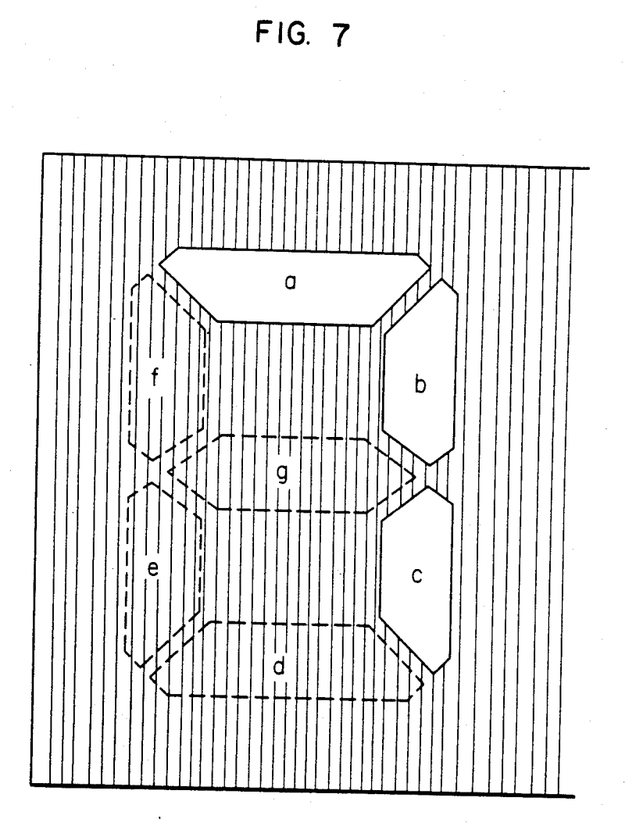
FIG. 7 is a diagram showing the 7-segment display section with segments a, b and c being activated by application of voltage pulses in rectangular waveform.

FIG. 7 shows part of the liquid crystal display panel in operation, displaying character "7" by application of the voltage in the rectangular waveform between the common transparent electrode 15 and all segment transparent electrodes 11 that belong to segments a, b and c. The remaining segments d, e, f and g have all their segment transparent electrodes 11 deactivated, and stay unlighted. Because of the same color filter arrangement for the entire area of the variable-color display section, these inactive segments d, e, f and g match indistinguishably with the background, whereby character display of satisfactory legibility and appearance can be achieved.

Although FIGS. 6 and 7 show only a small portion for displaying a character for the explanatory purpose, the same color filters are arranged in the entire area of the liquid crystal display panel 30 shown in FIG. 3.

The present invention is effective in accomplishing a liquid crystal color display apparatus including a variable-color display section and a fixed-color display section on a single panel, wherein active pattern segments in both sections have the same brightness and, at the same time, inactive pattern segments have the same visibility as the background, whereby the liquid crystal color display apparatus with enhanced legibility and appearance can be realized.

We claim:

1. A liquid crystal display apparatus comprising a liquid crystal display panel having segment electrodes and common electrodes interposing liquid crystal material therebetween and a liquid crystal drive circuit, said panel including a variable-color display section which is provided with color filters in a plurality of colors arranged on said segment electrodes or on said common electrode so as to produce arbitrary color in said variable-color display section through selective activation of said segment electrodes, and a fixed-color display section which is provided with a color filter placed outside of said liquid crystal display panel, wherein said liquid crystal drive circuit is operative to control said liquid crystal display panel so as to separately control said variable-color display section and said fixed-color display section.

2. A liquid crystal display apparatus according to claim 1, wherein said segment electrodes and said common electrodes in said liquid crystal panel are disposed in the same distance from each other in both of said variable-color display section and said fixed-color display section, and wherein said liquid crystal material is the same substance for both of said variable-color display section and said fixed-color display section.

3. A liquid crystal display apparatus according to claim 1, wherein said common electrodes in said liquid crystal display panel are provided separately for said variable-color display section and for said fixed-color display section.

4. A liquid crystal display apparatus according to claim 1, wherein said segment electrodes in said liquid crystal display panel are arranged in a striped formation.

5. A liquid crystal display apparatus according to claim 4, wherein said color filters in said variable-color display section are arranged in a striped formation.

6. A liquid crystal display apparatus according to claim 1, wherein said variable-color display section comprises display pattern segments and a background area surrounding said segments, said background area being provided with dummy color filters.

7. A liquid crystal display apparatus according to claim 6, wherein said segment electrodes and said common electrodes in said liquid crystal panel are disposed in the same distance from each other in both of said variable-color display section and said fixed-color display section, and wherein said liquid crystal material is the same substance for both of said variable-color display section and said fixed-color display section.

8. A liquid crystal display apparatus according to claim 6, wherein said common electrodes in said liquid crystal display panel are provided separately for said variable-color display section and said fixed-color display section.

9. A liquid crystal display apparatus according to claim 6, wherein said segment electrodes in said liquid crystal display panel are arranged in a striped formation.

10. A liquid crystal display apparatus according to claim 9, wherein said color filters in said variable-color display section are arranged in a striped formation.

* * * * *